F. WHITNEY.
ROLLER BEARING.
APPLICATION FILED JAN. 9, 1914.
1,208,428.
Patented Dec. 12, 1916.
2 SHEETS—SHEET 1.
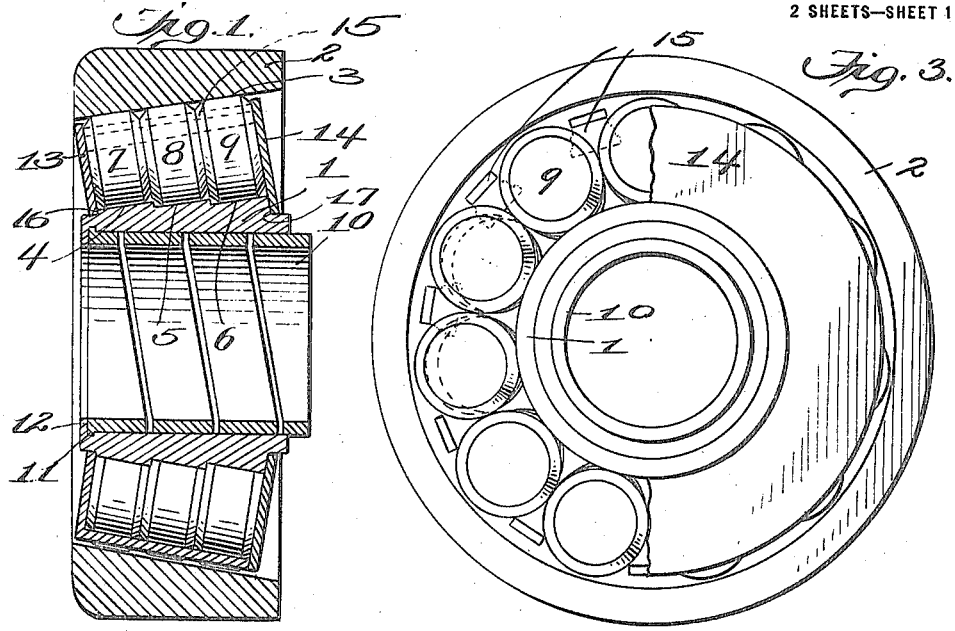
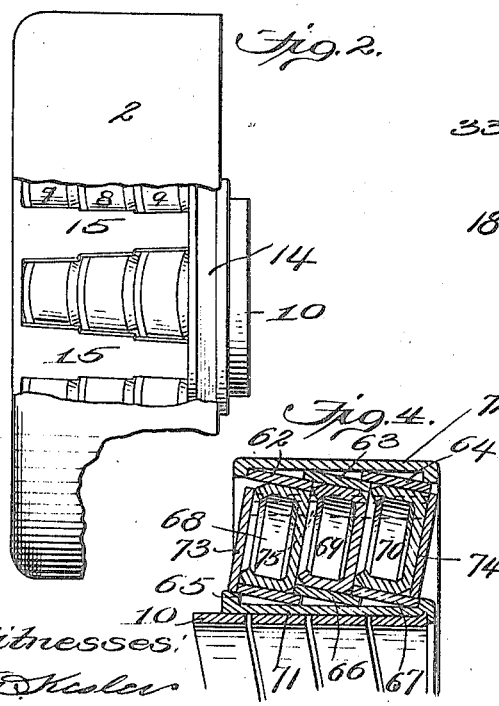
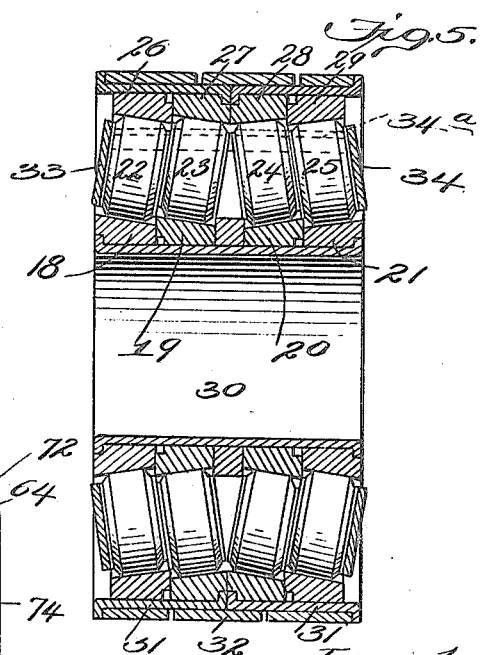
Witnesses:
Inventor
Frank Whitney

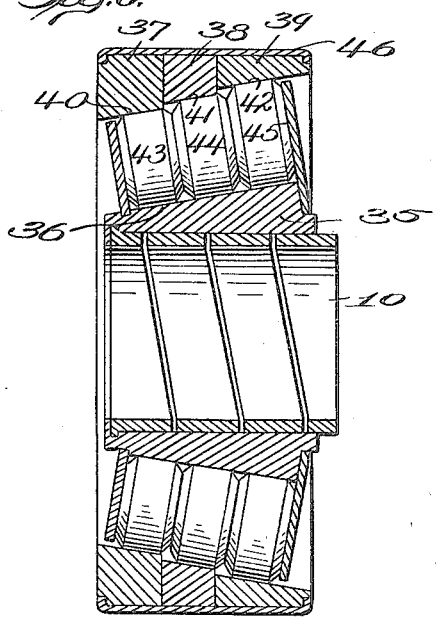
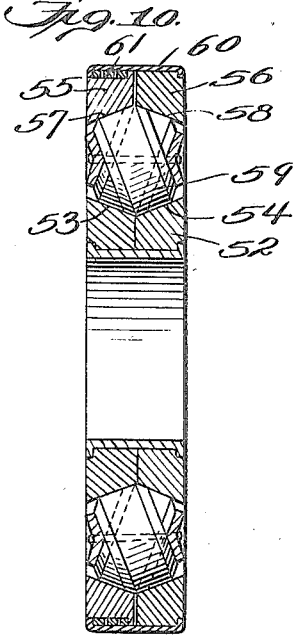
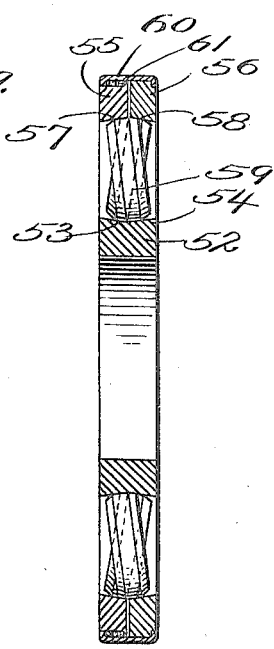
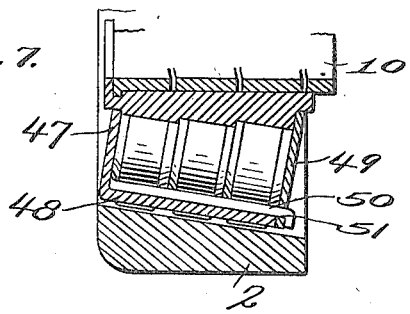
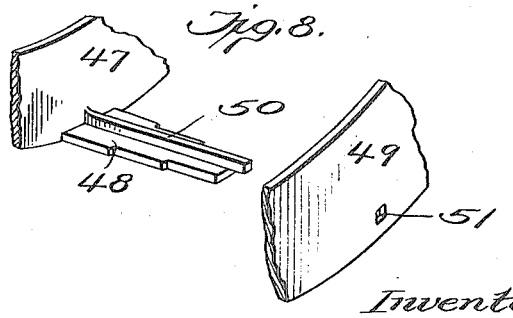

UNITED STATES PATENT OFFICE.

FRANK WHITNEY, OF HUBBARD WOODS, ILLINOIS.

ROLLER BEARING.

1,208,428.

Specification of Letters Patent.

Patented Dec. 12, 1916.

Application filed January 9, 1914. Serial No. 811,244.

*To all whom it may concern:*

Be it known that I, FRANK WHITNEY, a citizen of the United States, residing at Hubbard Woods, in the county of Cook and State of Illinois, have invented new and useful Improvements in Roller-Bearings, of which the following is a specification.

This invention relates to improvements in roller bearings, and the primary objects of the invention are to provide an improved bearing of this class wherein friction and wear are reduced to a minimum; to provide a relatively long bearing surface in a bearing of minimum radial dimension and which sustains end thrust in one or both directions; to provide a bearing of unit construction which so unites the elements that tampering therewith by incompetent persons is prevented; to provide a bearing which can be built up of different numbers of sections in order to provide a bearing of any desired length; and to provide means which afford a stronger and greater degree of automatic adjustment of the bearing to take up lost motion or wear.

A further object of the invention is to provide a bearing wherein the cones or bearing members and the rollers as well as the cage can be made of sheet metal, thus facilitating cheapening in the cost of manufacture.

To these and other ends, the invention consists in certain improvements, and combinations and arrangements of parts, all as will be hereinafter more fully described, the novel features being pointed out particularly in the claims at the end of the specification.

In the accompanying drawings:—Figure 1 represents a longitudinal section through a bearing constructed in accordance with one embodiment of the invention; Fig. 2 is a top plan view partly broken away; Fig. 3 is an end elevation, partly broken away, of the bearing as shown in Fig. 1; Fig. 4 represents a longitudinal section of a portion of a bearing of the type shown in Fig. 1, but showing the same constructed of sheet metal; Fig. 5 is a longitudinal section of a bearing adapted to sustain not only radial loads but also end thrust in both directions, and showing the cones or bearing members built up of sections; Fig. 6 represents a longitudinal section of a bearing showing the outer cone or bearing member composed of a plurality of sections; Figs. 7 and 8 are detail views showing the construction of a cage adapted for use in a bearing of the type shown in Fig. 6; Figs. 9 and 10 are longitudinal sections of bearings of minimum length and adapted to sustain radial loads and end thrust in both directions.

Similar parts are designated by the same reference characters in the several views.

Roller bearings embodying the present invention are adapted for use in various instances where it is desirable or necessary to sustain shafts which are subject to relatively heavy loads with minimum friction and wear.

Of course, it will be understood that in applying the bearings they may be modified to adapt them to their different uses, and it will also be understood that the invention is not restricted to the precise construction shown, as equivalent constructions within the scope of the claims can be used.

In the construction shown in Figs. 1, 2 and 3, the bearing comprises an inner bearing member or cone 1, an outer bearing member or cone 2, and roller elements interposed between and coöperating with said bearing members. The inner bearing member 1 may be secured as usual to the shaft and the outer bearing member to the part mounted on the shaft. In the construction shown in this instance, the bearing members have tapered or conical surfaces with which the roller elements coöperate. As shown, the outer bearing member 2 has a single conical bearing surface 3 and the inner bearing member has a series of conical bearing surfaces 4, 5 and 6, these bearing surfaces just mentioned having the same angle to the same point as the conical bearing surface 3 and being arranged in stepped relation. Series of rollers 7, 8 and 9 coöperate on their outer sides with the conical bearing surface 3 and on their inner sides with the stepped conical bearing surfaces 4, 5 and 6 respectively. The rollers vary in diameters according to the distance between the stepped conical bearing surfaces 4, 5 and 6 and the outer bearing surface 3. In such an arrangement, the relative diameters of the conical raceways and their coöperating rollers will insure free and practically frictionless operation of the rollers without involving a differential movement of the rollers as the latter travel through the bearing at the same rate of speed and they revolve at the same speed. In a bearing of this construction, lost motion or wear between the bearing members and the rollers can be readily taken up by shifting one of the bearing members axially with respect to the other member. Means is shown for taking up this play or wear automatically, it embodying an expansible sleeve 10 which is made by coiling a strip of flat resilient material helically. This sleeve, as shown in Fig. 1, is fitted over the shaft and within the inner bearing member 1, one end of the sleeve abutting against a shoulder 12 at the smaller end of the inner bearing member, and the opposite end of the sleeve can be compressed and held under compression by a stationary collar or abutment on the shaft, the resilient sleeve 10 being retained within the bearing member 1 to form a unit therewith by a lip 11 on the sleeve 10 engaging in a groove formed in the member 1 as shown.

The present invention provides means for uniting the elements thereof in a manner which will prevent incompetent persons from tampering with the rollers. As shown, the rollers are confined in a cage and the cage is permanently fixed to one of the cones or bearing members. As shown in Fig. 1, the cage embodies end plates 13 and 14 between which the rollers are confined and connecting members 15 which permanently unite the end plates. One of the end plates (the plate 13 in the construction shown) abuts against a shoulder 16 on the bearing member 1, while the inner periphery of the end plate 14 abuts against a shoulder 17 on said bearing member, the cage being thereby guided properly and it is united to the bearing member 1 in a manner which will prevent persons unskilled in the adjustment or repair of bearings of this type from tampering therewith.

Fig. 5 shows a construction which enables a bearing of any desired length to be provided, the inner and outer bearing members being composed of narrow cones, any number of which may be used. In this instance, the inner bearing member is composed of a plurality of sections 18, 19, 20 and 21 forming conical raceways for the respective series of rollers 22, 23, 24 and 25, and the outer bearing member is composed of conical bearing sections 26, 27, 28 and 29 which coöperate with the outer sides of the respective series of rollers 22, 23, 24 and 25. The bearing shown in this figure is not only capable of sustaining radial loads, but will also sustain end thrust in both directions. For this purpose, the conical surfaces of the inner and outer bearing members 18, 19, 26 and 27 have their apices at one side of the bearing while the conical bearing members 20, 21, 28 and 29 have their apices located at the opposite side of the bearing. The conical surfaces of the opposed bearing members or sections are preferably of equal angles and the rollers are of cylindrical form. The sections composing the inner bearing member are preferably united permanently, a sleeve 30 being shown for this purpose, the sections of the inner bearing member being mounted on this sleeve and secured thereon by crimping or flanging the ends of the sleeve, as shown, and the sections composing the outer bearing member are united permanently by a pair of sleeves 31—31 which inclose them and are flanged or crimped at their inner ends to secure these sections of the bearing together in pairs. In this construction, means is also provided to compensate automatically for lost motion or wear between the bearing members and the rollers. As shown, a longitudinally expansible sleeve 32 surrounds the sleeves 31—31, the outer ends of the latter being flanged or crimped to provide abutments for the ends of the expansible sleeve, this sleeve as shown being composed of a strip of flat resilient material coiled helically and the ends of the sleeve bear against the flanged or crimped ends of the sleeves 31—31, tending to force them and the respective groups of bearing members 26, 27, and 28, 29 outwardly or away from one another and thereby take up automatically any play or wear which may exist between said bearing members and their coöperating rollers. In order to guide and permanently retain the rollers within the bearing, a pair of cage rings 33 and 34 may be used, these cage rings confining the outer series of rollers and, as shown, they are connected by the spacing members 34ᵃ which maintain proper distance between the cage rings and also space the rollers.

The construction shown in Fig. 6 is similar to that shown in Fig. 1, it embodying bearing members, one of which has a single conical bearing surface and the other a plurality of stepped conical surfaces. In Fig. 6, however, an inner bearing member 35 is shown which has a single bearing surface 36 and the outer bearing member is composed of a plurality of conical sections 37, 38 and 39 having conical bearing surfaces 40, 41 and 42 arranged in stepped relation. These stepped conical bearing surfaces are preferably of the same angle as the single bearing surface 26. Series of rollers 43, 44 and 45 are interposed between the conical bearing surfaces, these rollers being cylindrical in form and varying in diameters to conform to the distances between their respective bearing surfaces, whereby the rollers of the different series will travel within the bearing at the same speed and they will revolve at the same speed. In the construction shown in Fig. 6, the sections composing the outer bearing member are rigidly and permanently united by an inclosing sleeve or casing 46 the edges of which may be crimped or flanged, as shown. The cage for guiding and retaining the rollers is of the same construction as that shown in Fig. 1. The expansible adjusting sleeve 10 is of the same construction as that shown in Fig. 1. A cage, however, of the construction shown in Figs. 7 and 8 may be used, the cage in that instance embodying an end plate 47 having the connecting members 48 formed integrally therewith and bent at an angle toward the end plate 49, studs 50 being fixed to the plate 47 the ends of which are adapted to pass through appropriately located apertures 51 in the plate 49 and to be clenched against the outer side thereof as shown in Fig. 7, this construction providing a cage which can be applied to unite the rollers as a unit with one of the bearing members and avoiding the necessity of welding the parts of the cage.

In Figs. 9 and 10, bearings are shown which have a minimum length and are capable of sustaining radial loads and also end thrust in both directions. In these cases, the bearing embodies an inner bearing member 52 having reversely sloping conical surfaces 53 and 54 and an outer bearing member composed of a pair of sections 55 and 56, the conical bearing surface 57 of the section 55 having the same angle as the bearing surface 54 of the inner bearing member and the conical bearing surface 58 of the section 56 having the same angle as the conical surface 53 of the inner bearing member. A series of rollers 59 is interposed between the bearing members, a portion of the rollers coöperating with the bearing surfaces 54 and 57 and the remaining rollers of the series coöperating with the bearing surfaces 53 and 58. The sections composing the outer bearing member may be permanently retained in coöperative relation by a peripheral sleeve 60 which is flanged at its ends, and a helically coiled and longitudinal expansible sleeve 61 is preferably interposed between one of the bearing sections (the section 55 in the present instance) and the inclosing sleeve or casing 60 to automatically take up lost motion or wear between the bearing members and the rollers.

The present invention also provides for the construction of a roller bearing wholly of sheet metal, thereby reducing the cost of manufacture to a minimum. An example of such a construction is shown in Fig. 4 wherein the bearing comprises a suitable number of conical outer bearing members 62, 63 and 64, and an inner bearing member composed of conical sections 65, 66 and 67, these conical sections being nested one within the other and forming pairs of stepped conical surfaces of equal angles. Series of cylindrical rollers 68, 69 and 70 are interposed between each pair of inner and outer conical bearing members, said rollers being shorter in axial length than their diameters. By nesting the inner and outer conical bearing members, the overlapping edges of the members assist in guiding the respective series of rollers laterally. These rollers may be formed from sheet metal, each roller having a cylindrical tread or periphery made from a sheet metal disk, the edges of which are drawn up at right angles and turned slightly inwardly. The nested inner and outer conical members are confined by the inner and outer sleeves 71 and 72, the edges of which are crimped, as shown. The series of rollers are guided by a cage embodying end rings 73 and 74 and transverse connecting members 75. Sheet metal cones and rollers so constructed are sufficiently accurate and smooth to afford the necessary rolling surfaces, and as the thickness of the sheet metal is substantially uniform, the rollers will be of substantially uniform strength on their different diameters. According to the present invention, radially resilient rollers may be used and by constructing the rollers of sheet metal this resiliency is afforded. By constructing the bearing of sheet metal, the expensive operations of cutting the cones and rollers from solid stock and hardening and grinding the same are avoided. In the bearing shown in Fig. 4, a longitudinally expansible adjusting sleeve 10 similar to that shown in Fig. 1 may also be used.

In each construction shown, the conical bearing members are of equal angle, and the rollers are cylindrical, and they advance at the same speed and the same number of revolutions, requiring only a single cage to each bearing, and this cage may be of sheet metal, as shown, or of any other construction. In all forms shown, there is no tendency of a twisting or winding action in the cage, such as is usually caused by insufficient movement of the rollers. From Fig. 1 it will be readily apparent how the present invention can be applied interchangeably to bearings having a plain-faced conical surface, such as is commonly used with tapered or other forms of rollers and is usually fixed permanently in the housing of the bearing. This is accomplished by providing the stepped inner cones and the series of narrow-faced rollers of different diameters to coöperate with the plain-faced outer cone or bearing member, the differences in the size of the rollers compensating for the reduction in diameter of the cone. Endwise displacement or any tendency thereto is avoided in all forms shown owing to the cylindrical form of the rollers. In the constructions employing the plural number of conical sections, the face of each section is shorter than the diameter of the roller with which it coöperates. A bearing of this type may be constructed of two or more of such cones and a single series of rollers.

Where such cones are used for both the inner and outer bearing members, the rollers are preferably of the same diameter and in all forms shown, the length of the conical bearing members is less than the diameter of the coöperating rollers.

I claim as my invention:—

1. In a roller bearing, the combination of bearing members, having opposed conical faces of equal angle with respect to the axis of the bearing, the larger end of one face adjoining and offsetting the smaller end of the adjacent face, and a series of rollers coöperative with each of said faces, each face being of less length than the diameter of the coöperating rollers.

2. In a roller bearing, the combination of opposed bearing members, one having a plurality of stepped conical faces of equal angle relatively to the axis of the bearing, and a series of cylindrical rollers coöperative with each of said faces and being of greater diameter than the width of said faces.

3. In a roller bearing, the combination of inner and outer conical bearing members, one of said members having a plurality of stepped conical bearing surfaces, and cylindrical rollers coöperative with the bearing members, the diameters of said rollers being greater than the length of the coöperating stepped bearing surfaces.

4. In a roller bearing, the combination of inner and outer conical bearing members, one of said members having a plurality of stepped conical bearing surfaces, the larger ends of said surfaces adjoining and offsetting the smaller ends of the adjacent surfaces, and series of cylindrical rollers, one series coöperative with each of said stepped conical surfaces.

5. In a roller bearing, in combination, inner and outer bearing members, one of said members having a plurality of stepped conical surfaces of equal angle relatively to the angle of the other bearing member, the larger ends of said surfaces adjoining and offsetting the smaller ends of the adjacent surfaces, and a series of cylindrical rollers coöperative with each stepped conical surface and having diameters greater than the lengths of the respective surfaces.

6. In a roller bearing, the combination of inner and outer bearing members, one of said members having a plurality of stepped conical surfaces of equal angle relatively to the axis of the bearing, the larger ends of said surfaces adjoining and offsetting the smaller ends of the adjacent surfaces, and a series of cylindrical rollers coöperative with each stepped conical surface, the rollers of the different series being of different diameters.

7. In a roller bearing, the combination of inner and outer bearing members, one of said members having a plurality of stepped conical surfaces of equal angle relatively to the axis of the bearing, the larger ends of said surfaces adjoining and offsetting the smaller ends of the adjacent surfaces, and a series of cylindrical rollers coöperative with each stepped conical surface, said rollers being greater in diameter than the length of their respective stepped conical surfaces.

8. In a roller bearing, the combination of conical bearing members, one having a series of stepped bearing surfaces of equal angle, rollers interposed between and coöperative therewith, and means for adjusting said members relatively in an axial direction embodying a longitudinally expansible helically coiled strip.

9. In a roller bearing, opposed bearing members having conical bearing faces of equal angle relatively to the axis of the bearing, and a cage of cylindrical faced rollers operating between said conical faces, said cage being composed of end rings and connecting sections forming an annular series of pockets for groups of rollers, one of said members having annular shoulders engaging the inner edges of said rings and constituting means for laterally guiding and retaining the relative positions of the cage, rollers, and the respective bearing member.

10. In a roller bearing, a conical bearing member provided with a plurality of conical faces arranged side by side, the larger edge of one conical face offsetting the smaller edge of the adjoining conical face, all of said conical faces being of the same angle relatively to the axis of the bearing, and a cage containing narrow-faced cylindrical rollers arranged and retained in groups and adapted to rotatably coöperate with said member.

11. A roller bearing provided with bearing members, having opposed conical faces of the same angle relatively to the axis of the bearing, and a cage containing a plurality of series of roller elements, the axes of said elements being offset but of the same angle.

12. In a roller bearing, a cage containing a multiple number of rollers whose axial lengths are less than their diameters, said rollers being arranged side by side in separately spaced groups, the axes of the rollers in each group offsetting one another.

13. In a roller bearing, the combination of bearing members having opposed conical faces of equal angle relatively to the axis of the bearing, and a cage containing a multiple number of rollers whose axial lengths are less than their diameters, said rollers being arranged side by side in separately spaced groups and the axes of the rollers of each group offsetting one another.

14. In a roller bearing, the combination with coöperative conical bearing members and roller elements operative between them, of an axially expansible sleeve or bushing capable of compression within the axial length of one of said members and operative axially to maintain the roller elements in close engagement with the bearing members.

15. In a roller bearing, a bearing member provided with an axially expansible sleeve or bushing capable of being compressed within the axial length of the said member, said member being provided with an offsetting portion adapted to engage one end of said sleeve.

16. In a roller bearing, a bearing member provided with an axially expansible sleeve or pushing, one end of which is adapted to coöperate with a groove at the far end of said member to retain the bushing and member together as a unit.

17. In a roller bearing the combination of coaxial members having conical bearing faces one of which is stepped, each step having the same angle to the axis of the bearing as the opposing conical bearing face, a number of annular series of cylindrical rollers adapted to work with the opposing conical faces of said members, the rollers of each annular series being of the same diameter and the rollers of different series being of progressively smaller diameters toward one end of the bearing, and means for confining the several rollers in place.

18. In a roller bearing the combination of coaxial members having opposing conical bearing faces one of which is stepped each step of one member being at the same angle to the axis of the bearing as the opposing conical face of the other member, and the several steps of one member being medially intersected by a cone whose axis coincides with the axis of the bearing, a number of annular series of cylindrical rollers interposed between said members, the rollers of each series being of the same diameter and the rollers of different series being of progressively smaller diameters toward one end of the bearing, and means for confining the several rollers in place.

19. In a roller bearing the combination of coaxial members having opposing conical bearing faces, one of which is stepped, each step of one member being at the same angle to the axis of the bearing as the opposing conical face of the other member, a number of annular series of cylindrical rollers interposed between said members, the rollers of each series being of the same diameter and the rollers of different series being of progressively smaller diameters toward one end of the bearing, and a cage having stepped partitions fitting opposite sides of the several rollers and adapted to confine them in place.

20. In a bearing, a bearing member having a plurality of conical bearing faces arranged in parallel planes one beside another, and a set of roller elements coöperative with said conical faces, the width of each conical face being less than the diameter of the coöperating roller elements.

21. In a roller bearing embodying roller elements of a plurality of diameters, a cage having pockets having stepped portions of different circumferential lengths to conform to the different diameters of said roller elements.

22. In a roller bearing embodying roller elements of a plurality of diameters of different dimensions, bearing members having conical bearing faces of equal angle relatively to the axis of the bearing, a cage for spacing and guiding said roller elements relatively to said faces, and means for guiding said cage laterally relatively to said members.

23. In a roller bearing, a plain cone-faced bearing member, a stepped cone-faced member, the bearing faces of said members being of equal angle relatively to the axis of the bearing, roller elements coöperating between said members, there being a single series of such roller elements to each step, the size of the roller elements of the different series varying in accordance with the diameter of the step with which they coöperate.

24. In a roller bearing embodying two or more series of cylindrical face roller elements, a bearing member comprising a plurality of conical bearing faces of equal angle with respect to the axis of the bearing, and means for retaining said roller elements and bearing member in the form of a bearing unit.

25. In a roller bearing embodying a plurality of roller elements of different diameters, a cage spacing and guiding said elements, the roller elements of each size being arranged in a single annular series and each series paralleling the other series and coöperating between bearing members.

26. In a bearing embodying bearing members having conical bearing faces of equal angle with respect to the axis of the bearing, a cage containing a number of sets of roller elements, each set consisting of a plurality of roller elements of the same diameter coöperating in a single annular series with said bearing members, the roller elements in any one set being of a diameter different from that of the roller elements in another set.

27. In a bearing embodying bearing members having conical bearing surfaces of equal angle with respect to the axis of the bearing, one of which members is stepped, a cage containing a number of sets of roller elements, the roller elements in each set being of the same diameter, and the elements in any one set being of a diameter different from that of the elements in another set, said cage of roller elements coöperating between the bearing members and each set of roller elements coöperating with a different step of the stepped member.

28. In a roller bearing, bearing members having conical bearing faces of equal angle with respect to the axis of the bearing, a cage of cylindrical roller elements of a plurality of diameters, and means for guiding said cage laterally.

29. In a roller bearing, bearing members one of which embodies stepped conical bearing faces, and roller elements arranged between and coöperating with said bearing members, the axial length of each stepped bearing face being less than the diameter of the roller elements coöperating therewith.

30. In a roller bearing, bearing members, one having stepped conical bearing faces of an angle, relatively to the axis of the bearing, equal to that of the bearing face of the coöperating member, and roller elements arranged between and coöperating with the bearing faces of said members.

31. In a roller bearing, bearing members, one having a plain conical face and the other member having stepped conical faces of an angle, relatively to the axis of the bearing, equal to that of the plain conical face of the coöperating member, and roller elements arranged between and coöperative with the faces of the bearing members.

32. In a roller bearing, bearing members having conical bearing surfaces of equal angle, with respect to the axis of the bearing, the bearing face of one member being stepped, and roller elements coöperating with said bearing faces, and means acting to relatively move said members axially to automatically adjust the roller elements and the bearing members.

33. In a roller bearing embodying bearing members having conical bearing faces, a cage containing a plurality of sets of roller elements, the roller elements of each set being of equal diameter but differing in diameter from those of another set.

34. In a roller bearing, bearing members having conical bearing faces, the bearing face of one member being stepped, and a plurality of sets of roller elements, each set to coöperate with a step in the bearing surface of one member and with the bearing face of the other member, the sets of roller elements being of graduated diameters, the set of larger diameter coöperating with that step of the bearing face of larger diameter and the set of smaller diameter coöperating with that step of the bearing face of smaller diameter.

In testimony whereof I have hereunto set my hand in presence of two subscribing witnesses.

FRANK WHITNEY.

Witnesses:
  GRACE C. DEILY,
  GEORGIA MARKS.